Figure 1:
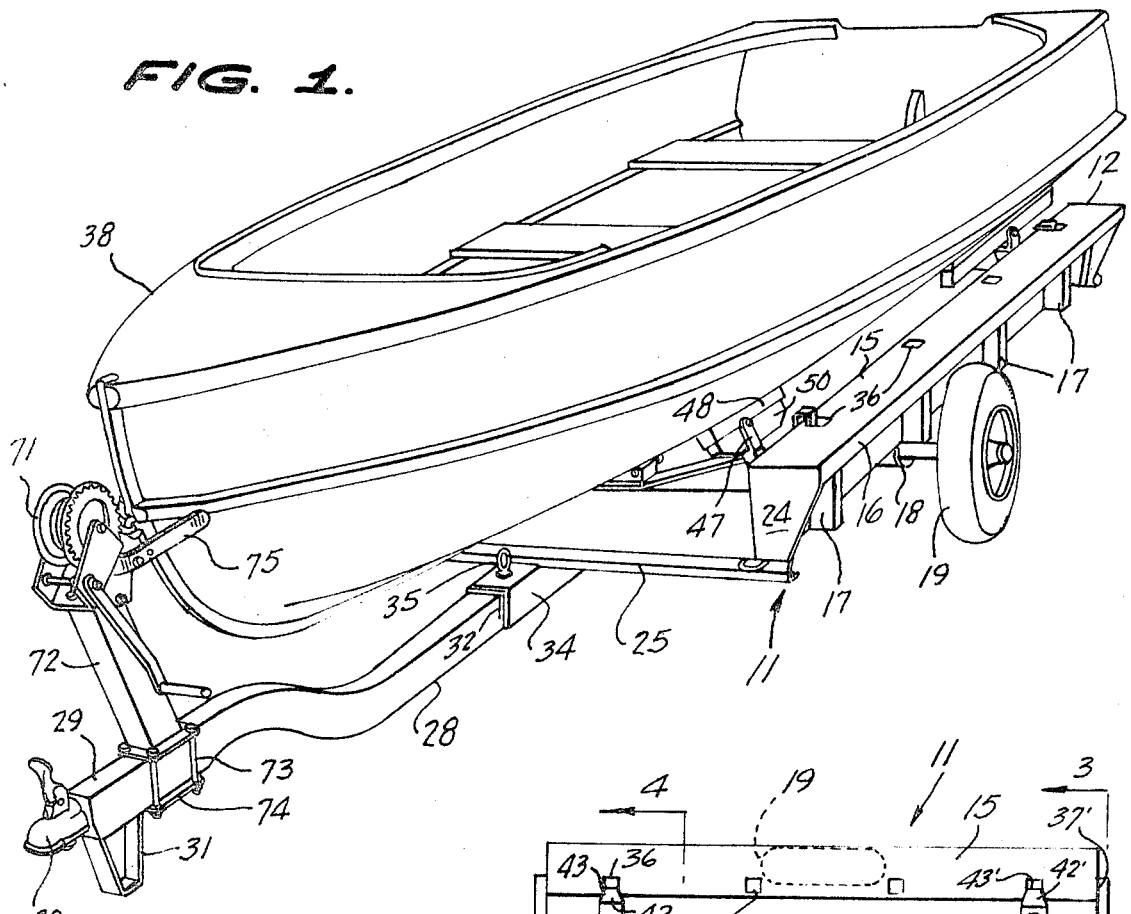

United States Patent

[11] 3,584,753

[72] Inventor Edward A. Voeller
 455 North Moore Road, Port Washington, Wis. 53074
[21] Appl. No. 861,241
[22] Filed Sept. 26, 1969
[45] Patented June 15, 1971

[54] BOAT-CARRYING KIT
 11 Claims, 6 Drawing Figs.
[52] U.S. Cl. ............................................ 214/500,
 214/505, 280/414, 296/23-B
[51] Int. Cl. ............................................ B60p 1/04
[50] Field of Search ............................................ 280/414;
 214/500, 505, 506; 296/23 B

[56] References Cited
UNITED STATES PATENTS
2,977,010 3/1961 Okey ........................... 214/500
3,058,756 10/1962 Holsclaw ..................... 280/414
3,098,674 7/1963 White ......................... 296/23 B
3,154,324 10/1964 Symes ......................... 280/414
3,266,836 8/1966 Taylor et al. ................. 280/414 X
3,488,084 1/1970 Ekstrom ...................... 296/23-B
3,524,659 8/1970 Filter ......................... 280/414

Primary Examiner—Leo Friaglia
Attorney—Berman, Davidson & Berman

ABSTRACT: A wheeled trailer body having a bed provided with upstanding longitudinal side fenders, whose top walls are apertured to receive either the bottom ends of the side stakes of a rectangular enclosure or depending lugs on the ends of a plurality of boat-supporting transverse brackets, so that the body can be adapted for use either as a cargo trailer or as a boat trailer. The trailer body has a hitch tongue for attachment to a motor vehicle. A winch assembly can be mounted on the hitch tongue when the body is used as a boat trailer.

PATENTED JUN 15 1971

3,584,753

SHEET 1 OF 3

INVENTOR.
EDWARD A. VOELLER,

BY Berman, Davidson & Berman
ATTORNEYS.

INVENTOR.
EDWARD A. VOELLER,

BY
Berman, Davidson & Berman,
ATTORNEYS

INVENTOR.
EDWARD A. VOELLER,
BY
Berman, Davidson & Berman,
ATTORNEYS.

BOAT-CARRYING KIT

This invention relates to trailers, and more particularly to a multipurpose trailer which can be adapted for use either for carrying a normal cargo enclosure or for carrying a boat.

A main object of the invention is to provide a novel and improved multipurpose trailer which is simple in construction, which can be quickly and easily set up for use, and which can be readily converted for use either to carry a cargo enclosure or to carry a boat.

A further object of the invention is to provide an improved multipurpose trailer which is inexpensive to manufacture, which is sturdy in construction, which is relatively compact in size, and which is easy to handle.

A still further object of the invention is to provide an improved multipurpose boat or cargo trailer, the trailer involving a minimum number of parts, being neat in appearance, and being arranged so that when it is employed for carrying a boat, the boat will be supported safely and will not suffer damage during its transportation.

A still further object of the invention is to provide an improved multipurpose trailer which can be employed either for hauling ordinary cargo or which can be quickly adapted for use as a boat trailer, the device being so arranged that it can be employed for carrying a wide range of sizes of boats and being further provided with means for readily mounting a boat thereon or discharging a boat therefrom.

Figure 2:
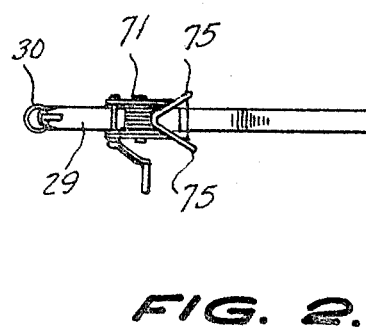
Figure 2:
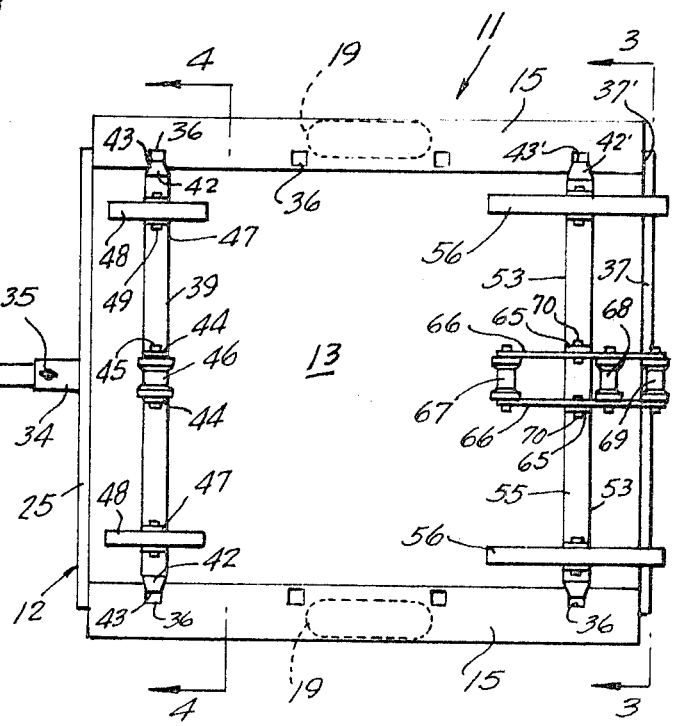
Figure 3:
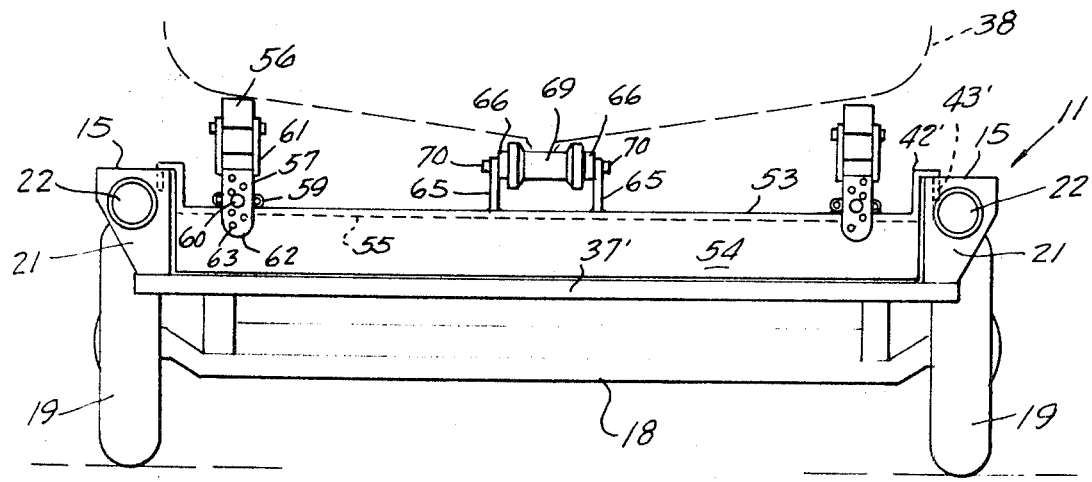
Figure 4:
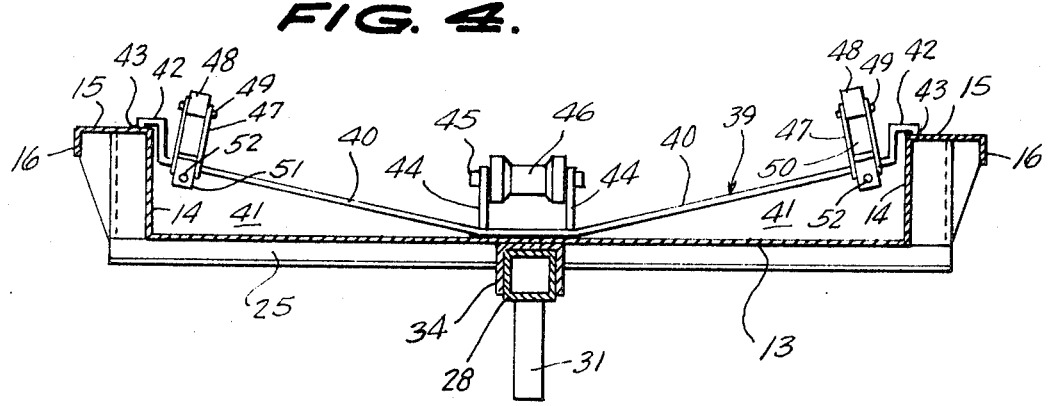
Figure 5:
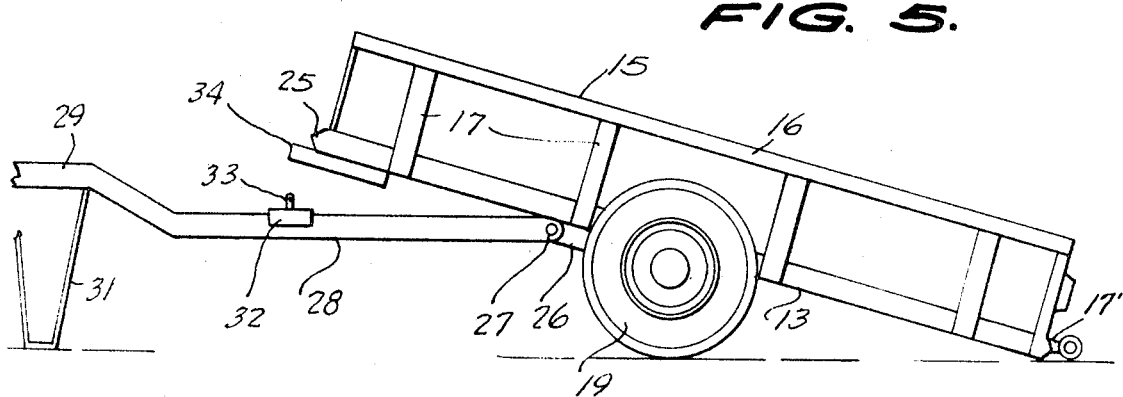
Figure 6:
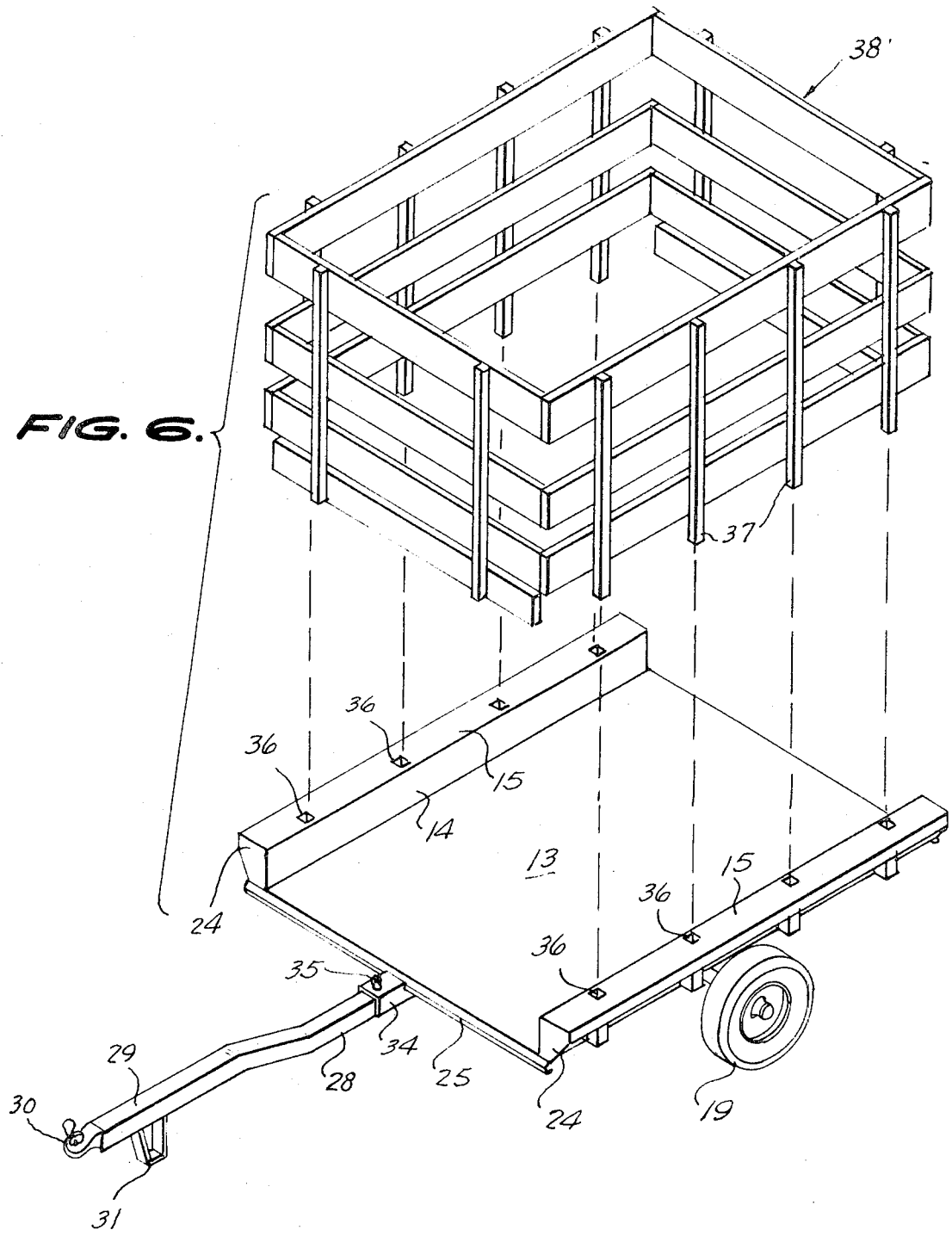

Further objects and advantages of the invention will become apparent from the following description and claims, and the accompanying drawings in which:

FIG. 1 is a perspective view of an improved trailer device according to the present invention, shown set up to carry a boat thereon, FIG. 2 is a top plan view of the trailer device of FIG. 1, drawn to a somewhat smaller scale, FIG. 3 is an enlarged rear elevational view of the trailer device, said view being taken substantially on line 3-3 of FIG. 2, FIG. 4 is an enlarged transverse cross-sectional view taken substantially on line 4-4 of FIG. 2, FIG. 5 is a somewhat enlarged side elevational view of the trailer device of FIGS. 1-4, with the hitch tongue connecting nut disengaged and with the trailer body inclined to a boat-loading or a boat-unloading position, and FIG. 6 is a perspective view showing how the trailer body of FIGS. 1-5 may be employed with a cargo enclosure for carrying normal cargo, the cargo enclosure being shown vertically separated from the trailer.

Referring to the drawings, 11 generally designates an improved trailer device constructed in accordance with the present invention. The device 11 comprises a wheeled trailer body, shown generally at 12 consisting of a generally rectangular bed 13 having upstanding longitudinal vertical sidewalls 14, 14 provided at their top ends with outwardly extending fenders 15,15, which extend substantially the entire length of the bed. The fenders terminate at their outer edges in depending vertical flanges 16, 16. The fenders are braced at longitudinally spaced intervals by vertical filler brackets 17. A transverse axle assembly 18 extends under the midportion of the bed and has respective supporting wheels 19,19 journaled to its opposite ends, as shown in FIG. 3. The wheels 19,19 are located beneath the longitudinal fenders 15, as is clearly shown in FIG. 3.

The fenders are provided at their rear ends with depending walls 21,21 on which may be mounted suitable tail lights, or reflectors, for example, reflectors 22,22, shown in FIG. 3. The fenders 15 are provided at their forward ends with depending front walls 24,24 of generally trapezoidal shape. The bottom ends of the front walls 24,24 and the front margin of the bed 13 are integrally connected to a transverse channel, which faces rearwardly, as is clearly shown in FIG. 1.

Rigidly secured to the bottom of bed 13 at its intermediate portion is a bracket 26, and pivoted at 27 to said bracket is a longitudinally extending and forwardly projecting hitch tongue 28, having the upwardly offset front end portion 29. The front end portion 29 is provided with conventional hitch socket means 30, adapted to be connected to a vehicle hitch ball. Rigidly secured to the bottom of the front portion 29 of the hitch tongue is a downwardly convergent, generally H-shaped rest bracket 31.

Designated at 32 is a channel bracket which is rigidly secured on hitch tongue 28 and which is provided with an upstanding stud 33. Rigidly secured transversely to the intermediate portion of the front margin of the trailer bed and projecting perpendicularly to the stiffening channel 25 is a downwardly facing channel bracket 34, which is nestable over the channel-shaped member 32 on the tongue 28, and which is apertured to receive the stud 33. A retaining nut 35 can be threaded on stud 33 to secure the tongue 28 subjacent the bed 13, namely, in the position shown in FIGS. 1—4, for normal towing of a cargo or boat carried on the device. As shown in FIG. 5, when the nut 35 is detached, the bed 13 may be tilted to the inclined position shown in the Figure, namely, to a position for loading a boat onto or unloading a boat from the device.

The fenders 15,15 are provided with the longitudinally spaced rectangular apertures 36 located to receive the bottom ends of the vertical side stakes 37 of a rectangular enclosure 38', shown in FIG. 6. Thus, with the stakes 37 received in the apertures 36, enclosure 38' will be retained on the trailer device and the device may be employed for hauling normal cargo. When it is desired to convert the trailer device for carrying a boat, the enclosure 38' is disengaged therefrom and further structure is employed for the conversion, as will be presently described.

As above mentioned, the front margin of the trailer body is provided with the stiffening channel 25 which transversely connects the front walls 24 of the fenders and the front edge of bed 13. A similar transverse channel 37' is provided at the rear end of the bed 13, the channel 37' integrally connecting the bottom margins of the rear fender walls 21,21 with the rear edge of bed 13, as shown in FIG. 3.

In converting the trailer device to carry a typical boat, such as the boat 38 shown in FIG. 1, a first transversely extending bracket member 39 is employed at the front portion of the trailer bed, said bracket member 39 comprising a shallow V-shaped flange 40 provided with the respective generally triangular, transversely extending web portions 41,41 engaging in the respective opposite corner portions defined by the sidewalls 14,14 relative to the horizontal bottom wall of the bed 13. The opposite ends of the flange portions 40 are formed with upwardly offset arms 42,42 which terminate in depending vertical lugs 43,43 receivable in transversely aligned opposite apertures 36,36, as is clearly shown in FIG. 2. At its midportion, the transverse bracket 39 is provided with a pair of upstanding vertical arms 44,44 connected at their top ends by a shaft 45 on which is journaled a rubber keel-supporting roller 46. Respective upstanding bunk-supporting brackets 47,47 are adjustably mounted on the opposite end portions of the transverse bracket member 39, said brackets having generally longitudinally extending cushioned bunks 48 transversely pivoted thereto at 49. The bunks 48 include suitable resilient deformable material, such as rubber or the like, so that they engage the opposite side portions of the bottom of a boat 38 supportingly and without causing any marring or scratching of the hull of the boat. The main bodies of the bunks may comprise rigid blocks 50, but the top portions thereof intended to engage the boat hull are suitably covered with thick layers of resilient deformable material, such as rubber, or the like. The brackets 47 are provided with opposite side arms between which the blocks 50 are received and between which said blocks are pivoted by the pivot bolts or shafts 49. The bottom ends of the brackets 47 may comprise depending lugs 51 extending on opposite sides of the transverse bracket 39 and connected by fastening bolts 52.

A second transverse bracket member 53 is provided at the rear portion of the trailer bed, said bracket member 53 comprising a generally rectangular depending transversely extending web portion 54 and a horizontal top flange 55. Respective longitudinally extending hull-engaging bunks 56,56 are supported by suitable brackets 57,57 secured to the opposite end portions of the transversely extending bracket 53. The bunks 56 are generally similar to the previously described bunks employed at the forward portion of the trailer device, except that the bunks 56 are preferably substantially longer than the previously described front bunks.

As shown in FIG. 3, the opposite end portions of the transversely extending bracket member 53 are provided with spaced longitudinally extending bolt sleeves 59 intended to receive the fastening bolts 60 of the bunk brackets 61 employed for the rear bunks 56. The depending straddling lugs 62 of the brackets 57 are similarly provided with a plurality of bolt apertures 63 so that the bolts 60 may be engaged through selected pairs of such apertures 63. This provides maximum adjustability of the positions of the brackets 61 and the ultimate positions of the hull-engaging bunks 56.

The transversely extending bracket member 53 is provided at its intermediate portion with the upstanding vertical spaced arms 65,65 to which are pivoted respective parallel bars 66,66 between which are journaled the plurality of rubber keel-supporting rollers 67, 68 and 69. It will be noted that one roller 67 is journaled between the bars 66, 66 at the forward ends of the bars, whereas the remaining rollers 68 and 69 are journaled between the rear portions of the bars 66, 66, on the opposite side of the pivotal connections 70, 70 of bars 66 to arms 65. Thus, the keel of a boat supported on the trailer device is supported by rollers located on opposite sides of the transverse pivotal block axes defined by pivotal connections 70, 70 and, therefore, the rollers are self-adjusting in accordance with the shape of the keel engaged thereby.

As in the case of the front bunks, the rear bunks 56 are provided with contact surfaces of suitable resilient deformable material, such as rubber or the like, for engaging the hull of the boat 38 to provide adequate support thereof, but without any risk of marring or damaging the hull.

The opposite ends of the transversely extending bracket member 53 are provided with the upwardly offset, generally hook-shaped members 42' having the depending vertical lug portions 43' engageable in transversely aligned apertures 36, in the same manner as the corresponding inverted hook elements provided on the front transverse bracket member 39.

When the apparatus is converted for use as a boat trailer, a conventional winch assembly 71 is mounted on the upwardly offset forward portion 29 of the hitch tongue 28, in the manner shown in FIG. 1, so that the winch cable thereof may be fastened to the front end of the boat to fasten it on the trailer. As shown in FIG. 1, the winch assembly 71 is provided with an upstanding supporting column 72, having a flanged bottom which is anchored on tongue portion 29 by clamping bolts 73 connecting the bottom flange of column 72 with an anchor plate 74 provided beneath tongue portion 29. The winch assembly is provided with the forwardly flaring contact arms 75, 75 adapted to conformably receive the front end of the boat 38 in the manner illustrated in FIG. 1.

As will be readily apparent, a boat 38 may be loaded on the device by allowing the bed 13 to assume the inclined position shown in FIG. 5, whereupon the boat may be drawn upon the trailer by means of the winch device 71. The keel is received in the rollers 46, 67, 68 and 69 and the opposite side portions of the boat hull are supportingly engaged by the pairs of bunks 48, 48 and 56, 56, in the manner above described. If so desired, the boat may be suitably lashed to the trailer bed in any desired manner to ensure its retention during transit.

As will be readily understood, after the boat has been loaded onto the trailer device, the bed is tilted to its normal horizontal position, and secured to said position by engaging the nut 35 on the upstanding stud 33 with the channel member 34 nested over the tongue channel 32, as above described.

With the bed 13 thus secured in horizontal position, the trailer may be hitched to a towing vehicle and transported to its intended destination. Unloading of the boat is performed by a reverse procedure, namely, by first unfastening the nut 35 and allowing the bed to assume an inclined position, as in FIG. 5, after which the lashings, if employed, are removed, and the boat is allowed to move off the trailer by unwinding the cable from the reel of the winch assembly 71 in the conventional manner.

While a specific embodiment of an improved multipurpose vehicle has been disclosed in the foregoing description, it will be understood that various modifications within the spirit of the invention may occur to those skilled in the art. Therefore, it is intended that no limitations be placed on the invention except as defined by the scope of the appended claims.

What I claim is:

1. In a trailer vehicle, a body comprising a bed having supporting wheels journaled to opposite sides thereof and having hitch tongue means secured thereto and extending forwardly therefrom for connection to a towing vehicle, respective longitudinally extending fenders on the opposite sides of said bed, substantially coextensive in length therewith, said fenders having outwardly projecting top walls overlying said wheels, said top walls being each formed with longitudinally spaced apertures, with the apertures of the opposite fenders in transverse alignment, a plurality of longitudinally spaced transverse bracket members on said bed, each bracket member having downwardly directed lugs at its opposite ends removably engaged in a pair of transversely aligned apertures, transverse keel-supporting means of the midportions of said bracket members, upstanding hull-engaging means on the end portions of the bracket members, and cable winch means on the hitch tongue means adapted to be connected to the forward end of a boat supported on said keel-supporting means and hull-engaging means.

2. The trailer vehicle of claim 1, and wherein said keel-supporting means comprises upstanding members on the midportions of the bracket members, and transverse rollers journaled on said upstanding members.

3. The trailer vehicle of claim 1, and wherein said keel-supporting means comprises respective pairs of spaced upstanding arms on the midportions of the bracket members, and transverse rollers journaled between the top ends of said pairs of upstanding arms.

4. The trailer vehicle of claim 1, and wherein there are two transverse bracket members, one being located adjacent the forward end of the bed and the other being located near the rear end of the bed.

5. The trailer vehicle of claim 4, and wherein said keel-supporting means comprises a pair of upstanding arms on the midportion of each transverse bracket member, and keel-supporting rollers journaled between the top portions of said pairs of upstanding arms.

6. The trailer vehicle of claim 4, and wherein said keel-supporting means comprises a first pair of upstanding arms on the midportion of the forward transverse bracket member, a first keel-supporting roller journaled between the top end portions of the first pair of arms, a second pair of upstanding arms on the midportion of the rear transverse bracket member, respective bar members pivoted on a common transverse axis to the top end portions of said second pair of upstanding arms for rotation in longitudinal vertical planes, and a plurality of space keel-supporting rollers journaled between said bar members.

7. The trailer vehicle of claim 6, and wherein the last-named keel-supporting rollers are journaled to the bar members on axes on opposite sides of the common transverse pivotal axis of the bar members.

8. The trailer vehicle of claim 7, and wherein the upstanding hull-engaging means of the end portions of the bracket members comprises respective upstanding supports secured to the bracket members, and longitudinally extending hull-engaging bunk members pivoted on the top portions of said supports.

9. The trailer vehicle of claim 8, and wherein said bunk members comprise elongated blocks provided with top portions of resilient deformable material.

10. The trailer vehicle of claim 9, and wherein said hitch tongue means comprises a longitudinal hitch bar pivoted to the intermediate portion of the bottom of said bed and extending forwardly a substantial distance beyond the forward end of the bed, a downwardly concave longitudinal channel member secured to the underside of the forward margin of the bed, projecting forwardly therefrom and nestingly receiving said hitch bar, the forwardly extending portion of the channel member having an aperture, an upstanding stud member on the hitch bar extending through the aperture of the channel member, and a removable fastener on the stud member acting to retain the channel member on the hitch bar.

11. The trailer vehicle of claim 10, and a cargo enclosure having longitudinally spaced depending projections at its sides located so as to be at times engageable in the longitudinally spaced apertures in the top walls of the fenders.